(12) United States Patent
Brocke

(10) Patent No.: US 11,201,464 B2
(45) Date of Patent: Dec. 14, 2021

(54) ARRANGEMENT FOR OVERLOAD PROTECTION FOR OVERVOLTAGE PROTECTION EQUIPMENT

(71) Applicant: DEHN + SÖHNE GMBH + CO. KG, Neumarkt/Opf. (DE)

(72) Inventor: Ralph Brocke, Ilmenau/Oberpörlitz (DE)

(73) Assignee: DEHN SE + CO KG, Neumarkt/Opf. (DE)

( * ) Notice: Subject to any disclaimer, the term of this patent is extended or adjusted under 35 U.S.C. 154(b) by 347 days.

(21) Appl. No.: 16/091,336

(22) PCT Filed: Apr. 4, 2017

(86) PCT No.: PCT/EP2017/058001
§ 371 (c)(1),
(2) Date: Oct. 4, 2018

(87) PCT Pub. No.: WO2017/182267
PCT Pub. Date: Oct. 26, 2017

(65) Prior Publication Data
US 2019/0140443 A1 May 9, 2019

(30) Foreign Application Priority Data

Apr. 19, 2016 (DE) .......................... 102016004736.4
Sep. 13, 2016 (DE) .......................... 102016011076.7

(51) Int. Cl.
*H02H 9/00* (2006.01)
*H01C 7/12* (2006.01)
(Continued)

(52) U.S. Cl.
CPC ............... *H02H 9/008* (2013.01); *H01C 7/12* (2013.01); *H01C 7/126* (2013.01); *H01T 1/14* (2013.01);
(Continued)

(58) Field of Classification Search
CPC .......... H02H 9/008; H02H 9/06; H02H 7/008; H01C 7/12; H01C 7/126; H01T 1/14; H01T 1/16; H01T 2/02; H01T 4/10; H01T 4/14
See application file for complete search history.

(56) References Cited

U.S. PATENT DOCUMENTS

| 8,982,525 B2 | 3/2015 | Durth et al. ................. 361/111 |
| 9,941,691 B2 | 4/2018 | Strangfeld et al. |

(Continued)

FOREIGN PATENT DOCUMENTS

| DE | 19545505 C1 | 5/1997 | ............... H01C 7/12 |
| DE | 102009004318 A1 | 12/2009 | ............... H01T 1/14 |

(Continued)

OTHER PUBLICATIONS

Notification Concerning Transmittal of International Preliminary Report on Patentability (Chapter I of the Patent Cooperation Treaty), in English, dated Nov. 1, 2018, which was issued by the International Bureau of WIPO in Applicant's corresponding international PCT application having Serial No. PCT/EP2017/058001, filed on Apr. 4, 2017.

(Continued)

*Primary Examiner* — Kyle J Moody
*Assistant Examiner* — Lakaisha Jackson
(74) *Attorney, Agent, or Firm* — Bodner & O'Rourke, LLP; Gerald T. Bodner; Christian P. Bodner

(57) ABSTRACT

The invention relates to an arrangement for overload protection of overvoltage protection devices, consisting of at least one type II surge arrester with or without a thermal disconnecting device that responds in the event of an of overload. According to the invention, a switching unit free of movable contacts is connected in series with the at least one surge arrester and structurally combined therewith, (Continued)

Figure 1:
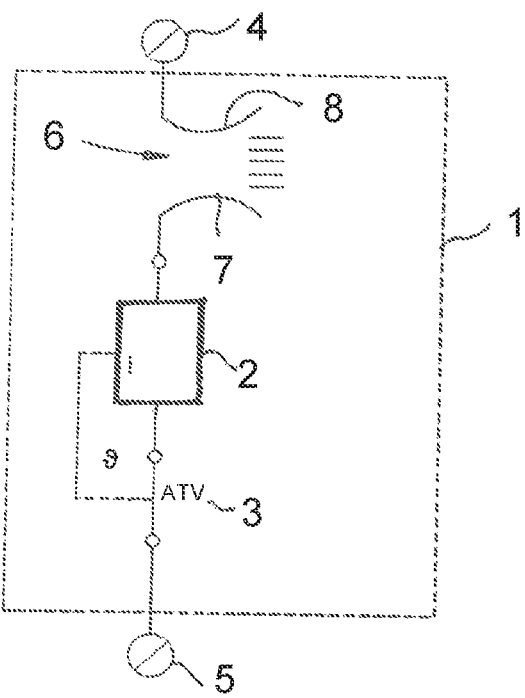

which switching unit has at least two fixed narrow spaced switching contacts, wherein the spacing of the switching contacts is specified in such a way that in the event of every surge current or discharge process, the switching device changes into a quasi-closed state because of the arc formed; whereas in the idle state, the voltage of the connected mains drops at the switching device, with the surge arrester arranged in series remaining free of leakage current.

9 Claims, 1 Drawing Sheet

(51) Int. Cl.
| | |
|---|---|
| *H01T 1/14* | (2006.01) |
| *H01T 1/16* | (2006.01) |
| *H01T 4/10* | (2006.01) |
| *H01T 4/14* | (2006.01) |
| *H01T 2/02* | (2006.01) |
| *H02H 9/06* | (2006.01) |
| *H02H 7/00* | (2006.01) |

(52) U.S. Cl.
CPC ............... *H01T 1/16* (2013.01); *H01T 2/02* (2013.01); *H01T 4/10* (2013.01); *H01T 4/14* (2013.01); *H02H 7/008* (2013.01); *H02H 9/06* (2013.01)

(56) References Cited

U.S. PATENT DOCUMENTS

2003/0214302 A1* 11/2003 Slamecka .......... G01R 31/3336
324/424
2004/0070913 A1* 4/2004 Macanda ................. H02H 9/06
361/120
2007/0253136 A1* 11/2007 Groth ....................... H01C 7/12
361/127

FOREIGN PATENT DOCUMENTS

| DE | 102013019391 A1 | 10/2014 | ............. H01H 37/76 |
| DE | 102015008136 A1 | 3/2016 | ............. H01T 1/14 |
| EP | 0183873 A1 | 6/1986 | ............. H01T 1/16 |
| EP | 2568480 A2 | 3/2013 | ............. H01C 7/02 |

OTHER PUBLICATIONS

English translation of the International Preliminary Report on Patentability (Chapter I of the Patent Cooperation Treaty), dated Oct. 23, 2018, which was issued by the International Bureau of WIPO in Applicant's corresponding international PCT application having Serial No. PCT/EP2017/058001, filed on Apr. 4, 2017.

Written Opinion of the International Searching Authority, in English, dated Jun. 30, 2017, which was issued by the International Bureau of WIPO in Applicant's corresponding international PCT application having Serial No. PCT/EP2017/058001, filed on Apr. 4, 2017.

International Search Report, in English, dated Jun. 30, 2017, which was issued by the International Bureau of WIPO in Applicant's corresponding international PCT application having Serial No. PCT/EP2017/058001, filed on Apr. 4, 2017.

* cited by examiner

ARRANGEMENT FOR OVERLOAD PROTECTION FOR OVERVOLTAGE PROTECTION EQUIPMENT

The invention relates to an arrangement for overload protection of overvoltage protection devices according to claim 1, consisting of at least one surge arrester with or without thermal disconnecting device that responds in the event of an overload An arrangement for overload protection of overvoltage protection devices is already known from DE 10 2013 019 391 A1.

This arrangement comprises at least one voltage-limiting element and at least one voltage-switching element as well as an alternative series fuse. The voltage-limiting element is designed as a varistor and the voltage-switching element as a spark gap, wherein these elements are connected in series.

Furthermore, to protect the voltage-limiting element from inadmissible pulse currents, a monitoring spark gap forming a bypass is connected in parallel to the series connection.

In addition, a thermal monitoring device may be provided, which upon the effects of aging, inadmissible high main system voltages and/or low-energy, periodic, high-frequency pulses bypasses both the monitoring spark gap and the voltage-switching element. This arrangement provides protection against overload with high pulse currents, but it also ensures protection against an inadmissibly strong heating of the voltage-limiting elements.

The surge arrester with integrated protection device in accordance with DE 10 2009 004 318 A1 is provided with at least one varistor and a PTC resistor, which is in thermal contact with the varistor. The varistor and the PTC resistor are electrically connected in series. In addition, a ceramic disc with PTC resistor behavior is arranged between two varistor discs in sandwich construction, said elements being directly interconnected both mechanically and electrically. Such a protection device is used in particular to prevent long mains frequency overvoltages.

Basically, there is a need to create surge arresters with intrinsically safe behaviour. This means that the respective surge arrester can handle all overload cases as well as internal failure states over the full range of possible line frequency prospective short circuit currents, e.g. from 0 to 25 kA, without gaps and without additional external overcurrent protective devices The prior art mentioned above is based on internal fuses or thermal disconnecting devices. Such means have deficiencies in the event of failure or overload, i.e. the entire range of major leakage currents up to medium short-circuit currents cannot be covered reliably.

Alternative switching concepts for intrinsically safe surge arresters, e.g. a combination of surge arresters with overvoltage protection devices require additional external components, some of which are very cost-intensive, require additional installation space and require a very complex design. Furthermore, in many cases there is a state of limitation of the efficiency in relation to the desired discharge capacity.

From the above it is therefore the object of the invention to specify an advanced arrangement for overload protection of overvoltage protection devices consisting of at least one surge arrester, in particular of type II with or without thermal disconnecting device, which responds in the event of an overload, which enables a complete coordination for all conceivable overload and failure cases and at the same time ensures that the used surge arrester in normal operation, not marked by a protective function, is preferably not subject to age-relevant loads.

The task of the invention is solved by an arrangement for overload protection of overvoltage protection devices pursuant to the combination of features in accordance with claim 1, wherein the sub-claims represent at least appropriate embodiments and further developments.

The arrangement for overload protection of overvoltage protection devices in accordance with the invention with at least one and in particular one type II surge arrester, e.g. designed as a metal oxide varistor (MOV), comprises a switching unit structurally connected thereto which is free of movable contacts.

This switching unit, which is free of movable contacts, is connected in series with the at least one surge arrester.

The switching unit comprises at least two fixed narrow spaced switching contacts, the spacing of the switching contacts being specified in such a way that in the event of every surge current or discharge process, the switching unit changes into a quasi-closed state as a result of the arc formed.

In the idle state, however, the voltage of the connected mains drops at the switching unit, with the surge arrester arranged in series remaining free of voltage load and therefore without leakage current, i.e. without stress and thus is not subject to ageing.

The structurally combined series connection between surge arrester and the special switching unit forms a new unit, which as an advanced overload protection as such provides the desired coordination for all overload and failure cases. At the same time, the arrangement is characterized in that it is not accompanied by a deterioration of the protective properties of the surge arrester used. To the contrary, the rated voltage of the surge arrester used can be selected lower, resulting in improved protective behaviour.

In an embodiment of the invention, the fixed switching contacts are realized in such a way that the arc generated in the event of a discharge remains static and there is no increase in the arc burning voltage.

The fixed switching contacts are to be understood as a technical solution which, although it is possible to specify or vary the gap between the contacts at the manufacturer's or applicant's end, does not comprise a movable part, having an electrical conductor that bridges the relevant contacts.

The switching unit is adapted for both, direct current use and further development of the invention as a switch that changes into the open state in the event of zero current passage of a line follow current.

In case of an overload of the surge arrester, the switching unit is already active, so that the arising mains frequency line follow current is interrupted and the arrangement is not destroyed.

Since in the idle state, the mains voltage drops above the switching unit and the surge arrester, e.g. designed as a varistor, is therefore disconnected from the mains, no leakage current flows in normal operation, which extends the service life of the surge arrester used. In this case even a thermally activated disconnecting device can be omitted.

As already described above, the surge arrester is a type II arrester, which is in particular adapted as varistor, here in turn specifically realized as metal oxide varistor (MOV).

The switching unit with its fixed, spaced apart contacts, is designed in such a way that in the event of surge currents, a quasi-switching process with current flow can be triggered via the arrester, wherein the arrester then fulfils the desired protective function.

If the discharge process is carried out as specified, the disconnection unit is released from the task of mains follow current deletion.

The power conversion in the switching unit can be limited during surge current operation by limiting the arc drop voltage between the switching contacts.

This means that there is only a very low and negligible burn-off or wear on the fixed switching contacts.

In a preferred embodiment of the invention, a switching unit is formed as a miniaturized, open spark gap or according to the principle of such a spark gap.

In addition, according to the invention, an overload protection unit is provided, arranged in series, consisting of a switching unit and a surge arrester, the unit being arranged in a housing, wherein two external terminals of the series connection are provided at the housing. This unit may be used as actual surge arrester, suitable for all conceivable cases of overload and malfunction. The above-mentioned external overcurrent protection device and/or a thermal disconnecting device for protecting the surge arrester can be omitted.

In the following the invention is explained in more detail based on exemplary embodiments and with reference to the attached Figures.

Figure 2:
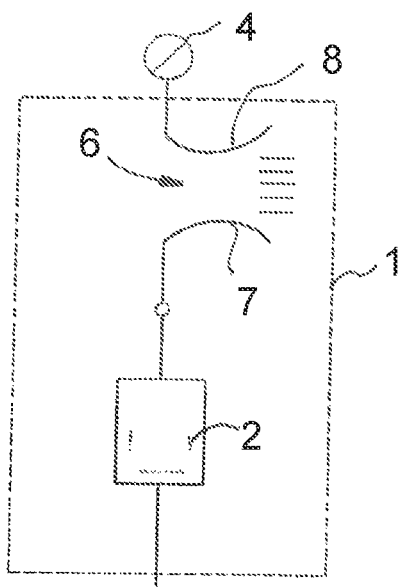

These show:

FIG. 1 a schematic illustration of the overload protection unit, comprising a series connection consisting of a switching unit and surge arrester with thermal disconnecting device and FIG. 2 an illustration similar to the one in accordance with FIG. 1, however with a type II surge arrester without additional thermal disconnecting device that responds in the event of an overload.

For the Figures, a unit 1 is first assumed.

This unit 1, which is characterized by a common housing, comprises in its interior a type II surge arrester 2.

This type II surge arrester 2 has, in case of the embodiment in accordance with FIG. 1, a thermal disconnecting device 3 that responds in case of overload, which is known per se.

Furthermore, unit 1 comprises external terminals 4 and 5.

The type two surge arrester is internally connected in series with a switching unit 6.

The switching unit comprises two fixed, non-movable contacts 7; 8.

The contacts 7; 8 are located closely spaced and can be part of the connections of the surge arrester 2.

The spacing is selected in such a way that in the event of every surge current or discharge process, the switching unit 6 changes into a quasi-closed state as a result of the arc formed.

Whereas in the idle state, the voltage of the mains connected to the terminals 4 and 5 drops at the switching unit 6, with the surge arrester 2 arranged in series remaining without leakage current and therefore without stress.

The switching unit 6 can be compared as to its function with a miniaturized spark gap, which is integrated as an additional component in unit 1 or in the surge arrester 2.

The response characteristic of the switching unit 6 is selected in such a way that it is also activated during each discharge process and is therefore closed on the current side in the event of overload or malfunction; whereas normally it remains passive.

The switching unit is embodied in such a way that surge current loads do not lead to unacceptable aging or similar effects.

This can be achieved by the emerging arc remaining at an ignition contact point during surge current operation.

According to an exemplary embodiment, the spacing of the switching contacts 7 and 8 is chosen to be very small. This avoids an increase in the arc drop voltage. Also in case of a surge current load, there only occur arc voltages within the range of 20 V to 30 V. Such a small arc voltage is only accompanied by a small power conversion in the emerging arc, which reduces burn-off or wear at the switching contacts.

The illustration in FIG. 2 is an alternative version to the embodiment due to the fact that no leakage current flows through the arrester 2 during normal operation due to the disconnection of surge arrester 2 from the mains through the open switching unit. This eliminates the need for a thermally activated disconnecting device. Due to the fact that the switching unit is active during each discharge operation, any emerging mains-frequency line follow currents may be limited and interrupted without time delays. In this case, the arc generated by the surge current is quickly moved away from the region between the switching contacts and is thereby extended and cooled, so that the arc voltage of the arc increases, thereby achieving the desired residual current limitation.

Since, unlike mechanical switchgears, the switching unit does not first have to disconnect the contacts on the basis of a spark gap as a backup protection device, there are no typical surge current problems as with contact-type switching devices. The switching unit may be quasi-triggered by a third contact which is located at a distance between the contacts 7 and 8.

Thus, an overload indicator is for example realizable.

The invention claimed is:

1. Arrangement for overload protection of overvoltage protection devices, consisting of at least one surge arrester (2), in particular of type II with or without thermal disconnecting device (3) which responds in an event of an overload,
wherein
the at least one surge arrester (2), which is structurally connected thereto, is connected in series with a switching unit (6) which is free of movable contacts and which comprises at least two fixed narrow spaced switching contacts (7; 8), a spacing of the respective at least two fixed narrow spaced switching contacts (7; 8) being specified in such a way that in the event of every surge current or discharge process, the switching unit (6) changes into a quasi-closed state as a result of an arc formed; whereas in an idle state, a voltage of a connected mains drops at the switching unit (6), with the at least one surge arrester (2) arranged in series remaining free of leakage current, wherein the switching unit (6) is formed as a miniaturized, open spark gap.

2. The arrangement according to claim 1,
wherein
the at least two fixed narrow spaced switching contacts (7; 8) are designed in such a way that the arc generated in the event of a discharge remains in place and an increase of the arc drop voltage is omitted.

3. The arrangement according to claim 1,
wherein
the switching unit (6) is designed as a switch which changes into an open state in an event of zero current passage of a line follow current.

4. The arrangement according to claim 1,
wherein
the surge arrester is embodied as a varistor, in particular as a metal oxide varistor (MOV).

5. The arrangement according to claim 1,
wherein
the switching unit (6) and the at least two fixed narrow spaced switching contacts (7; 8) are designed in such a way that in the event of surge currents, a quasi-switching process with current flow can be triggered via the at least one surge arrester (2).

6. The arrangement according to claim 1,
wherein
a power conversion in the switching unit (6) can be limited for each surge current operation by limiting an arc voltage between the at least two fixed narrow switching contacts (7; 8).

7. The arrangement according to claim 1,
wherein
an overload indicator is activated when the switching unit (6) is overloaded and triggered for the first time in order to deactivate or replace the surge arrester.

8. The arrangement according to claim 1,
wherein
the surge arrester is deactivated or destroyed on initial overload and activation of the switching unit (6).

9. The arrangement according to claim 1,
arranged in a housing comprising a series connection of the at least one surge arrester and the switching unit, wherein two external terminals (4; 5) of the series connection are provided.

\* \* \* \* \*